(12) United States Patent
Gariador et al.

(10) Patent No.: US 7,536,716 B2
(45) Date of Patent: May 19, 2009

(54) LABELING GATEWAY FOR COMPARTMENTED MULTI-OPERATOR NETWORK ELEMENTS OVER A HETEROGENEOUS NETWORK

(75) Inventors: Frederic Gariador, Ottawa (CA); Olivier Le Moigne, Ottawa (CA); Bertrand Marquet, Ottawa (CA)

(73) Assignee: Alcatel Lucent, Paris (FR)

( * ) Notice: Subject to any disclaimer, the term of this patent is extended or adjusted under 35 U.S.C. 154(b) by 844 days.

(21) Appl. No.: 10/417,117

(22) Filed: Apr. 17, 2003

(65) Prior Publication Data

US 2004/0210768 A1 Oct. 21, 2004

(51) Int. Cl.
G06F 15/16 (2006.01)
H04J 3/16 (2006.01)
(52) U.S. Cl. .................. 726/11; 709/230; 370/466
(58) Field of Classification Search .................. 709/223, 709/230; 726/3, 11; 713/190–201; 370/466
See application file for complete search history.

(56) References Cited

U.S. PATENT DOCUMENTS

| | | | | |
|---|---|---|---|---|
| 5,533,116 | A * | 7/1996 | Vesterinen | 379/243 |
| 5,903,732 | A * | 5/1999 | Reed et al. | 709/229 |
| 5,999,179 | A * | 12/1999 | Kekic et al. | 715/734 |
| 6,195,677 | B1 * | 2/2001 | Utsumi | 709/201 |
| 6,272,537 | B1 * | 8/2001 | Kekic et al. | 709/223 |
| 6,289,462 | B1 * | 9/2001 | McNabb et al. | 726/21 |
| 6,311,265 | B1 * | 10/2001 | Beckerle et al. | 712/203 |
| 6,499,059 | B1 | 12/2002 | Banshaf | |
| 6,546,425 | B1 * | 4/2003 | Hanson et al. | 709/227 |
| 6,847,609 | B1 * | 1/2005 | Sarnikowski et al. | 370/229 |
| 6,871,193 | B1 * | 3/2005 | Campbell et al. | 705/67 |
| 6,874,016 | B1 * | 3/2005 | Gai et al. | 709/215 |
| 6,987,768 | B1 * | 1/2006 | Kojima et al. | 370/401 |
| 2003/0046390 | A1 * | 3/2003 | Ball et al. | 709/224 |

FOREIGN PATENT DOCUMENTS

| | | | |
|---|---|---|---|
| EP | 1 327 934 A | | 7/2003 |
| WO | WO 01/08354 A | | 2/2001 |

OTHER PUBLICATIONS

Kenneth O. Zoline; An approach for interconnecting SNA and XNS networks; 1985, ACM.*
Gottfried Schimunek et al, Slicing the AS/400 with logical partitioning A how to guide, 1999, IBM Crop.*
Grimm, R. et al: "Security policies in OSI-management experiences from the DeTeBerkom project BMSec", Computer Networks and ISDN Systems, North Holland Publishing, Amsterdam NL., vol. 28, No. 4, Feb. 1996, pp. 499-511.

* cited by examiner

Primary Examiner—Nasser G Moazzami
Assistant Examiner—Mohammad W Reza

(57) ABSTRACT

The present invention provides adequate service virtualization and compartmentalization in Network Management Systems for heterogeneous Network Elements to provide interoperability. It introduces a generic mediation layer that can be added to each Network Element that does not provide a network compartmentalization model that is compatible with the one used by the Network Management System. The mediation layer acts as a reverse proxy for the Network Management System to provide an operator with transparent access to an appropriate Management Service. The present invention is also instrumental in providing a high level of security in such hybrid networks.

10 Claims, 3 Drawing Sheets

LABELING GATEWAY FOR COMPARTMENTED MULTI-OPERATOR NETWORK ELEMENTS OVER A HETEROGENEOUS NETWORK

FIELD OF THE INVENTION

The invention relates to the field of network management and more particularly to providing a highly secure Network Management System for a network of heterogeneous Network Elements through compartmentalization and virtualization techniques.

BACKGROUND OF THE INVENTION

Earlier systems and methods introduce the use of mandatory access control to enforce strong compartmentalization between operators of a Network Management System. They also propose mechanisms to carry information about compartmentalization through the network, thereby allowing extension of the compartmentalization to a set of hosts.

Such mechanisms are highly relevant to Network Management Systems, as they can be used to transparently extend to the whole network, compartments defined for operators in the Network Management System. This extension enables implementation of a strong information flow control between operators, each operator being provided, through service virtualization, with a specific view of the network.

The invention disclosed in the co-pending U.S. application Ser. No. 10/045,048 filed on Jan. 15, 2002, describes the use of a compartmentalized Operating System to increase the security of a Network Management Infrastructure, especially when it addresses a Multi-operator environment.

Several standards exist to carry information related to compartmentalization with the traffic. The CIPSO (Commercial Internet Protocol Security Option), for example, communicates security information within and between different security domains. It provides for multiple security domains utilizing a single software environment. Another example of these standards would be the FIPS188 which also supports a large number of compartments. Furthermore, there exists several operating systems that claim compliance with these standards (e.g., SELinux and Trusted Solaris).

Despite the existence of standards, interoperability between different systems that claim to have an implementation of those standards is not guaranteed. As a result, compartmentalization through the network often requires usage of similar Operating Systems.

This constraint is not acceptable in the scope of a Network Management System. Networks are often made of a large variety of heterogeneous Network Elements (e.g., different vendors). It is not reasonable to expect that these Network Elements be built on top of a set of Operating Systems that implement compatible network compartmentalization mechanisms. For example, some Network Elements might be built on top of operating systems that provide non-interoperable network compartmentalization mechanisms: compartmentalization techniques could be different from one system to another. Other Network Elements might be built on top of standard operating systems that do not provide compartmentalization features. Furthermore, even systems that implement compartmentalization do not always support services virtualization needed to provide each operator with a specific view of the network according to the operator's compartment.

The lack of compartmentalization on one of the two hosts involved in a communication, the implementation of different network compartmentalization techniques on these two hosts, and the implementation of similar network compartmentalization techniques configured with inconsistent compartment definitions, are the main foundations for incompatibility. Consequently, service virtualization and compartmentalization through a managed network becomes difficult to achieve because of the heterogeneous nature of such a network, which leads to interoperability problems.

These limitations necessitate the need for a network scheme that allows the integration of different network compartmentalization techniques within a network while providing interoperability between the miscellaneous elements of that network.

SUMMARY OF THE INVENTION

To overcome the limitations of the prior art described above, and to overcome other limitations that will become apparent upon reading and understanding the present specification, the present invention accordingly implements compartmentalization and virtualization techniques.

The present invention provides the advantage of allowing the integration of different network compartmentalization techniques within a network while providing interoperability between the miscellaneous elements of that network.

The present invention enables service virtualization on a system that does not natively implement this concept. It does so by introducing a generic mediation layer that can be added to each Network Element that does not provide a network compartmentalization model that is compatible with the one used by the Network Management System. The mediation layer acts as a reverse proxy to provide an operator with transparent access to an appropriate Management Service.

The present invention allows, through compartmentalization, the providing of a high level of security that is required for a hybrid network: ample security is needed for a network composed of heterogeneous Network Elements and supporting different network compartmentalization techniques.

BRIEF DESCRIPTION OF THE DRAWINGS

In order that the invention may be more clearly understood, a prior art device and devices according to the present invention will now be described with reference to the accompanying drawings in which.

DETAILED DESCRIPTION OF THE INVENTION

The following description is presented to enable a person skilled in the art to make use of the invention and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
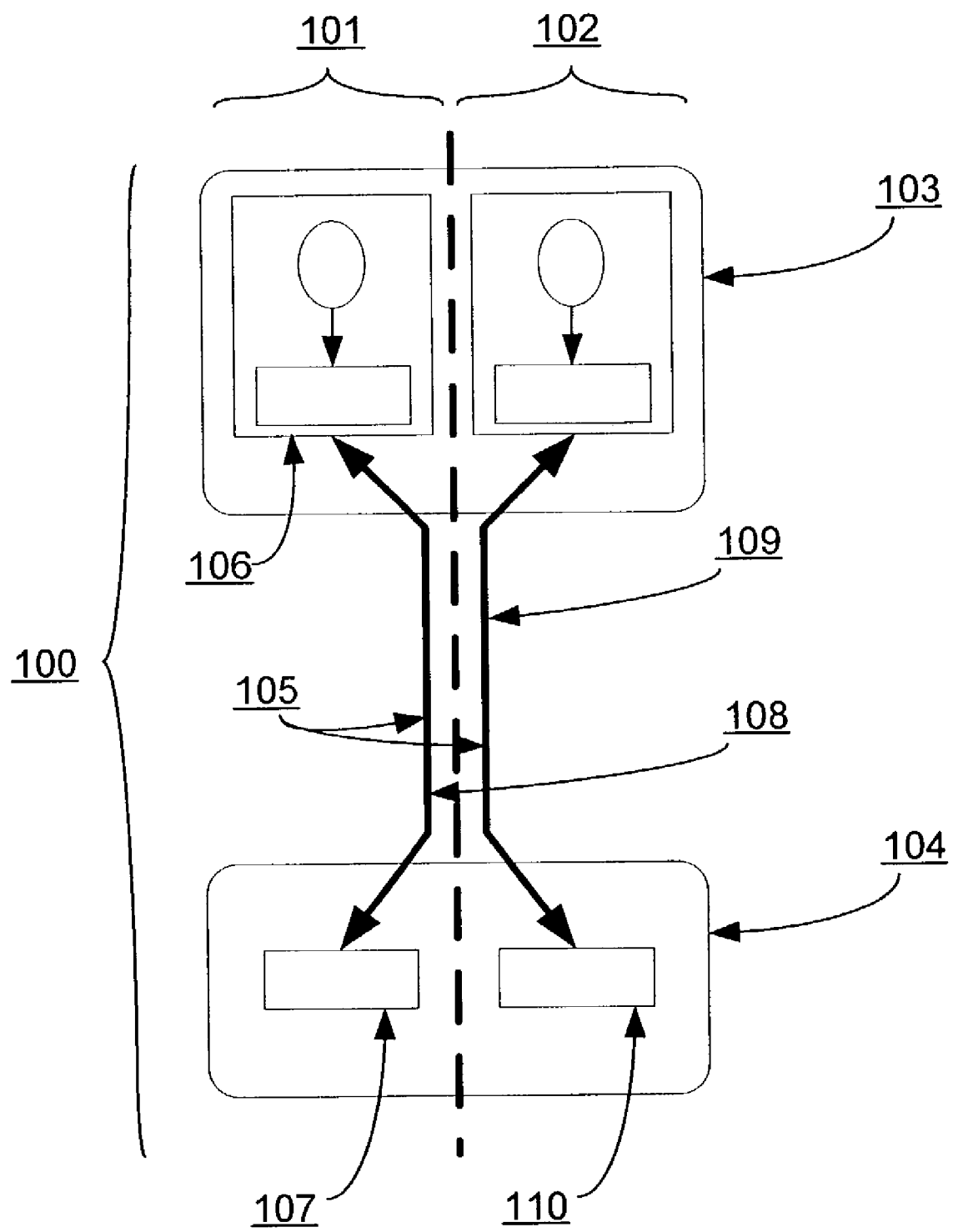
FIG. 1 shows an example illustrating the prior art system.

As exemplified in FIG. 1, existing systems require homogeneous compartmentalization techniques. Only two compartments, compartment A 101 and compartment B 102, are employed to illustrate the purpose of this example. A network 100 comprises of a Network Management System 103, a Network Element 104, and channels of communication 105 between the two. For a network 100 to be managed effectively, it is usually compartmentalized, with each compartment comprising of elements similar to the ones mentioned above: compartment A 101 has its own compartment management system 106, its own compartment element 107, and its own channels of communication 108. The same applies to compartment B 102.

The management system 106 of compartment A 101 can only manage the element 107 of that compartment. A management connection from the management system 106 of compartment A 101 traverses the channels 108 of that compartment to administer the element 107 of the same compartment. For a management connection from compartment A 101 to administer the element 110 of compartment B 102, calls for the element 107 of compartment A 101 and the element 110 of compartment B 102 to be built on top of a set of operating systems that implement compatible network compartmentalization mechanisms.

The invention of this application provides a solution to the aforementioned interoperability problem based on a Labeling Conversion Gateway (hereinafter, referred to as LCG). The LCG addresses the compatibility issues that contemporary Network Management Systems fail to sufficiently deal with by offering adequate service virtualization and compartmentalization, in Network Management Systems for heterogeneous Network Elements, to provide interoperability. It is also instrumental in providing a high level of security in such hybrid networks.

The LCG is a generic mediation layer that can be added to each Network Element that does not provide a network compartmentalization model that is compatible with the one used by the Network Management System. The LCG acts as a reverse proxy for the Network Management System to provide an operator with transparent access to an appropriate Management Service.

Figure 2:
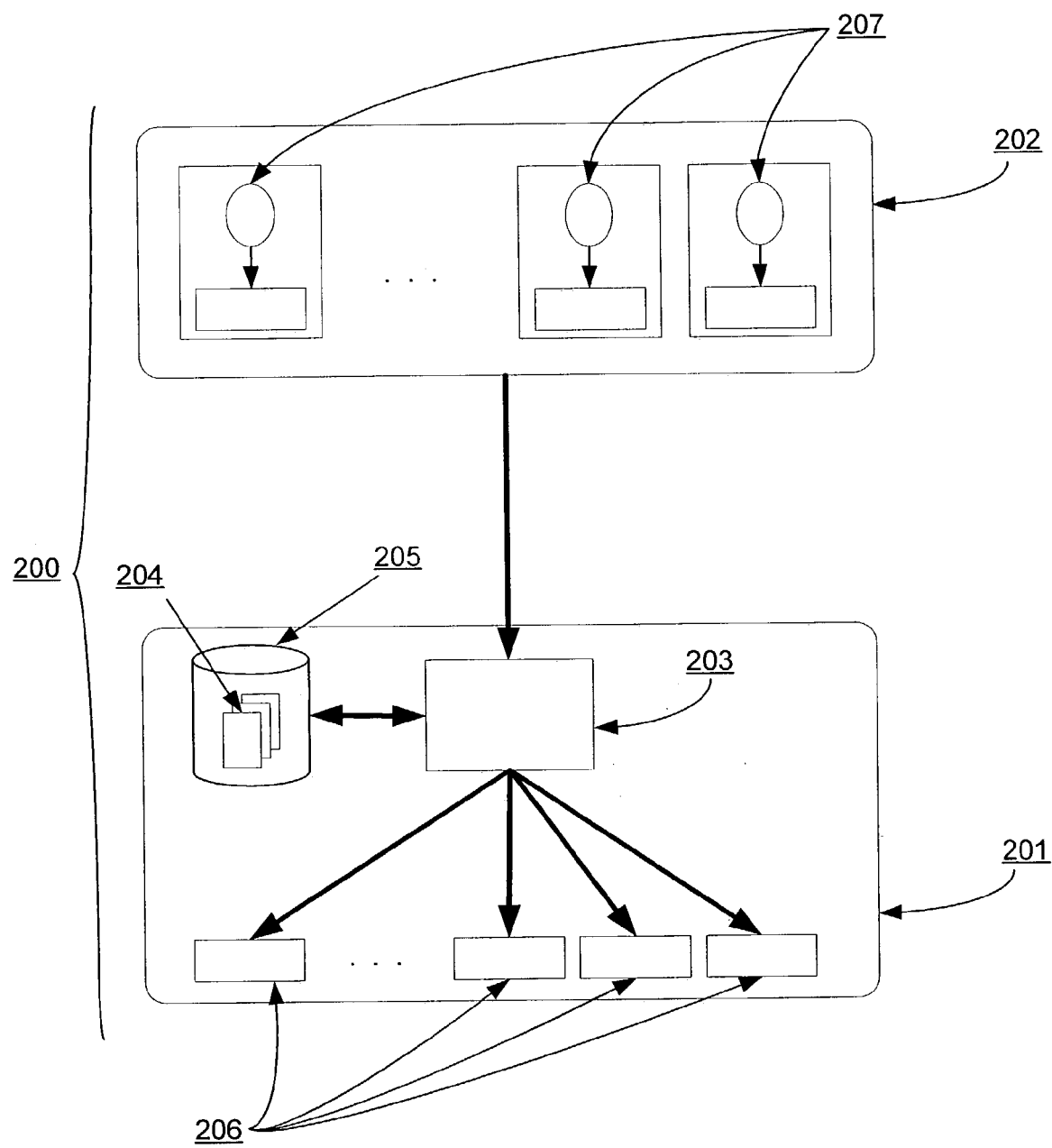
FIG. 2 is a block diagram outlining the functionality of the disclosed invention.

As shown in FIG. 2, in a network 200, the LCG 203 is integrated into the Network Element 201, and it deflects all of the incoming management connections from the Network Management System 202 to that Network Element 201. After receiving the management connection, the LCG 203 maps it to the appropriate Management Service 206. The LCG 203 then relays the management connection to the Management Service 206, thereby providing the operator 207 with management access to the Network Element 201.

For an efficient implementation of the invention, it is required that the Management Services 206 be accessible only through the LCG 203. One way to achieve this would be to bind a management service to a loop-back interface that cannot be accessed directly from a remote system. The loopback interface and its alternatives are considered to be well known to a person skilled in the art.

Networks are inherently susceptible to attack by exploitation of security weaknesses in network protocols and infrastructure components. By constraining all of the incoming management connections to access their Management Services 206 through the LCG 203, the present invention provides a level of network security: the LCG 203 monitors and authorizes (by using labeling information, for example), all management connections before rendering access to the Management Services 206.

The mapping between the incoming connection and the appropriate Management Service 206 is defined by a Labeling Conversion Policy 204 (hereinafter, referred to as LCP), which is stored in a database 205 on the Network Element 201. Incoming connections are mapped according to any of the following: the IP source address, the IP destination address, the transport protocol used (TCP, UDP or both), the TCP or UDP destination port, or the labeling information contained in IP options.

A connection that matches an entry of the LCP 204 is relayed to the appropriate Management Service 206 by the LCG 203 according to the LCP 204. The LCP 204 can specify changes to the following information in the incoming connection: the IP destination address, the TCP or UDP destination port, and the labeling information contained in IP options. A connection that does not match an entry of the Labeling Conversion Policy is left unchanged.

Figure 3:
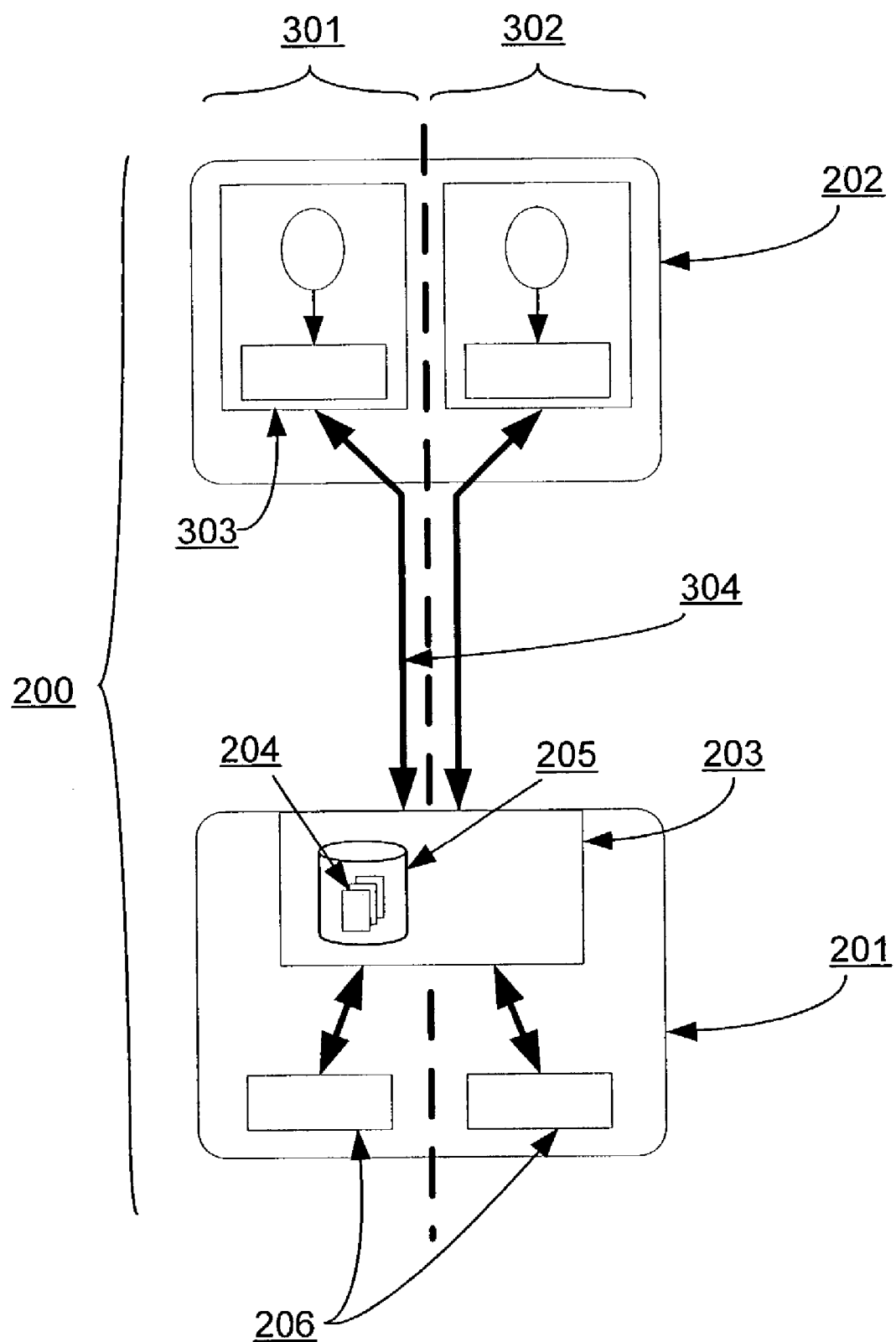
FIG. 3 echos FIG. 1 to accentuate the main difference between the prior art and the disclosed invention.

To further clarify the present invention, FIG. 3 is presented to—in combination with FIG. 1—depict the main difference between the prior art and the disclosed invention. To reflect the illustration of FIG. 1, as well, only two compartments are employed in this example: compartment A 301 and compartment B 302.

A management connection from the management system 303 of compartment A 301 traverses the channels 304 of that compartment to reach the LCG 203, which is integrated into the Network Element 201. Subsequently to mapping the incoming management connection in accordance to the LCP 204, which is also stored on the Network Element 201, the management connection can be relayed to any Management Service 206.

The scheme described above can be built into Network Elements during production or added on to existing Network Elements that do not natively implement this concept.

What is claimed is:

1. A method of sharing a network element (NE) of a communication network between a plurality of operators, said method comprising the following steps:
   providing all NEs that include elements that do not support management by said operators in a compartment of a compartmented network management system (NMS) with a label conversion gateway( LCG) that acts as a reverse proxy for said NMS and provides at least one of said operators with management access to said NE;
   mapping, with said LCG, an incoming service request with a management service to be executed by said NE as defined by a Labeling Conversion Policy (LCP) stored in a database on said NE;
   making changes corresponding to entries in said LCP, when needed, to at least one of the following:
      an Internet Protocol (IP) address of a destination of said incoming service request,
      a Transmission Control Protocol (TCP) destination port of said incoming service request,
      a User Datagram Protocol (UDP) destination port of said incoming service request, and
      labeling information contained in IP options; and
   executing, at said NE, said service according to a policy pre-established for said operators of said compartment of said NMS, 2. The method of claim 1, further comprising the following step:
   relaying said incoming service request with a mediator to said NMS.

3. the method of claim 2 further comprising the following step:
   Specifying said changes required by said mediator to relay said incoming service request in said policy.

4. The method of claim 2, further comprising the following step:
   accessing said management service only through said mediator.

5. The method of claim 3, further comprising the following step:
  storing said policy on said NE.

6. A compartmented network management system (NMS), comprising:
  means for providing all network elements (NEs) including elements that do not support management by an operator in a compartment of said NMS with a label conversion gateway (LCG) that acts as a reverse proxy for said NMS and provides at least one of said operators with management access to said NE;
  means for mapping, with said LCG, an incoming service request with a management service to be executed by said NE as defined by a Labeling Conversion Policy (LCP) stored in a database on said NE;
  means for making changes corresponding to entries in said LCP, when needed, to at least one of the following:
    an IP address of a destination of said incoming service request,
    a TCP destination port of said incoming service request,
    a UDP destination port of said incoming service request, and
    labeling information contained in IP options; and means for executing, at said NE, said service according to a policy pre-established for said operators of said compartment of said NMS.

7. The system of claim 6, further comprising a mediator on each said NE that relays said incoming service request to a said management service.

8. The system of claim 7 comprising means for verifying that said changes are specified in said policy.

9. The system of claim 7, further comprising means for denying access to said management service unless said access is through said mediator.

10. The system of claim 6, wherein said NE comprises means for storing said policy.

* * * * *